United States Patent
Nesse et al.

(10) Patent No.: US 7,775,142 B2
(45) Date of Patent: Aug. 17, 2010

(54) METHOD AND DEVICE FOR PROCESSING CARBON BODIES

(75) Inventors: Oddvin Nesse, Årdalstangen (NO); Jan Egil Pallin, Heimdal (NO); Hans Seehuus, Melhus (NO); Jens Bugge Hatlevoll, Årdalstangen (NO)

(73) Assignees: Norsk Hydro ASA, Oslo (NO); Lyng Drilling AS, Vanvikan (NO)

( * ) Notice: Subject to any disclaimer, the term of this patent is extended or adjusted under 35 U.S.C. 154(b) by 432 days.

(21) Appl. No.: 11/659,429

(22) PCT Filed: Jul. 15, 2005

(86) PCT No.: PCT/NO2005/000261
§ 371 (c)(1), (2), (4) Date: Aug. 14, 2007

(87) PCT Pub. No.: WO2006/019304
PCT Pub. Date: Feb. 23, 2006

(65) Prior Publication Data
US 2008/0107489 A1    May 8, 2008

(30) Foreign Application Priority Data
Aug. 16, 2004    (NO) .................................. 20043412

(51) Int. Cl.
*B23B 3/00* (2006.01)
*B23B 41/06* (2006.01)
(52) U.S. Cl. .............................. 82/1.11; 82/1.4; 407/66
(58) Field of Classification Search .................... 82/1.1, 82/1.4; 407/66, 67, 33
See application file for complete search history.

(56) References Cited

U.S. PATENT DOCUMENTS

| | | | | |
|---|---|---|---|---|
| 2,139,957 A | * | 12/1938 | Inskeep | 148/194 |
| 2,158,998 A | * | 5/1939 | Zitzler | 313/356 |
| 2,350,974 A | * | 6/1944 | Grayson | 407/56 |
| 3,761,379 A | * | 9/1973 | Elliot | 204/225 |
| 5,090,287 A | | 2/1992 | Chezem | |
| 5,673,214 A | * | 9/1997 | Kim et al. | 708/402 |
| 6,186,706 B1 | * | 2/2001 | Nesse et al. | 408/1 R |

FOREIGN PATENT DOCUMENTS

| | | |
|---|---|---|
| EP | 0922516 | 6/1999 |
| JP | 2024022 | 1/1990 |
| NO | 78403 | 4/1951 |
| RU | 2162490 | 1/2001 |

OTHER PUBLICATIONS

Norwegian Search Report issued Apr. 5, 2005 in International (PCT) Application No. NO2005/000261.

* cited by examiner

*Primary Examiner*—Will Fridie, Jr.
(74) *Attorney, Agent, or Firm*—Wenderoth, Lind & Ponack, L.L.P.

(57) ABSTRACT

The present invention concerns a method and a device for processing calcinated carbon bodies such as anodes or cathodes for use in connection with electrolytic production of aluminum. The carbon bodies are processed using a rotating processing tool that includes a mainly circular disc with cutting edges mounted at its periphery. The cutting edges may be made of polycrystalline diamond (PCD) or an equivalent material. Thus, it is possible to create slots in calcinated carbon bodies in an efficient manner with low tool wear.

11 Claims, 2 Drawing Sheets

METHOD AND DEVICE FOR PROCESSING CARBON BODIES

BACKGROUND OF THE INVENTION

I. Field of Use

The present invention relates to a method and a device for processing carbon bodies. In particular, the present invention concerns the processing of grooves or slots in calcinated carbon bodies.

II. Description of Related Art

In aluminum electrolysis using the so-called Hall-Héroult method with prebaked anodes, gas bubbles are created at the wearing (or consumable) surfaces of the anodes (mainly underneath them).

The presence of a gas layer means that the electrical resistance towards the bath increases, resulting in reduced current efficiency. In accordance with the prior art, solutions are proposed that involve ducts or grooves being created in the wearing surfaces of the anodes in order to drain the gas away, conduct it out of the bath and collect it in a degassing system. The prior art also proposes creating longitudinal grooves in the cathode carbon in order to be able to incorporate electrically conductive cathode rods.

Grooves in carbon bodies can be formed or preformed when the bodies are in a green state, i.e. before calcination or baking. One disadvantage of this is that the geometry of the grooves may be changed during handling and baking on account of creep or external mechanical stress. Such preforming may result in density gradients in the anode and rejects in the process. It may therefore be necessary to process (calibrate) the grooves so that they have the correct geometry.

The prior art also proposes processing holes in calcinated carbon bodies using mechanical equipment comprising a milling head that is similar to a drill bit for drilling bedrock, see EP 0922516. However, this equipment is not appropriate for creating slots with an extent equivalent to that of the carbon body, as it generally rotates around an axis perpendicular to the surface of the body and will suffer from capacity restrictions in connection with such a task.

US 2003/0075163 A1 describes a saw blade with inserts partly of polycrystalline diamond and partly of a carbide material. The blade is suitable for sawing a composite material comprising cement, ground sand and cellulose fiber, which is a material with completely different properties and which therefore also requires a different processing process than the present material.

SUMMARY OF THE INVENTION

The present invention relates to a method and a device that allow effective, precise processing of slots in calcinated carbon bodies, while the life of the equipment is considerably greater than what can be achieved using available technology. One problem with the processing of calcinated carbon electrodes is that the use of liquid for cooling/lubricating the tool during processing must be avoided, as moisture in the electrodes may result in major disadvantages for electrolysis. Moreover, calcinated carbon material is relatively porous so that, if liquid is used, the electrodes must undergo a comprehensive cleaning/drying process. These disadvantages mean that it is desirable to carry out the processing without the presence of cutting/cooling liquid, which increases the load on the processing tool. In theory, it would be conceivable to process the carbon bodies immediately after they have been calcinated in a furnace so that the residual heat is used to dry any liquid applied to the bodies. However, such a processing process might also produce increased thermal load on the tool and the carbon bodies. The limitations of the prior art equipment are primarily in the processing tool itself. A tool has thus been developed that is shaped as a circular disc with cutting edges along the periphery (like a saw blade) to solve the present problems. One advantage is that the geometry and material of the cutting edges contribute to a considerable increase in life in relation to what has been possible with prior art technology. With the present solution, slots can be created in calcinated carbon bodies even without them being preformed in a green state.

The above and other advantages can be achieved with the invention as it is defined in the attached claims.

BRIEF DESCRIPTION OF THE DRAWINGS

The present invention will be described in further detail in the following using figures and examples, where.

DETAILED DESCRIPTION OF THE INVENTION

Figure 1:
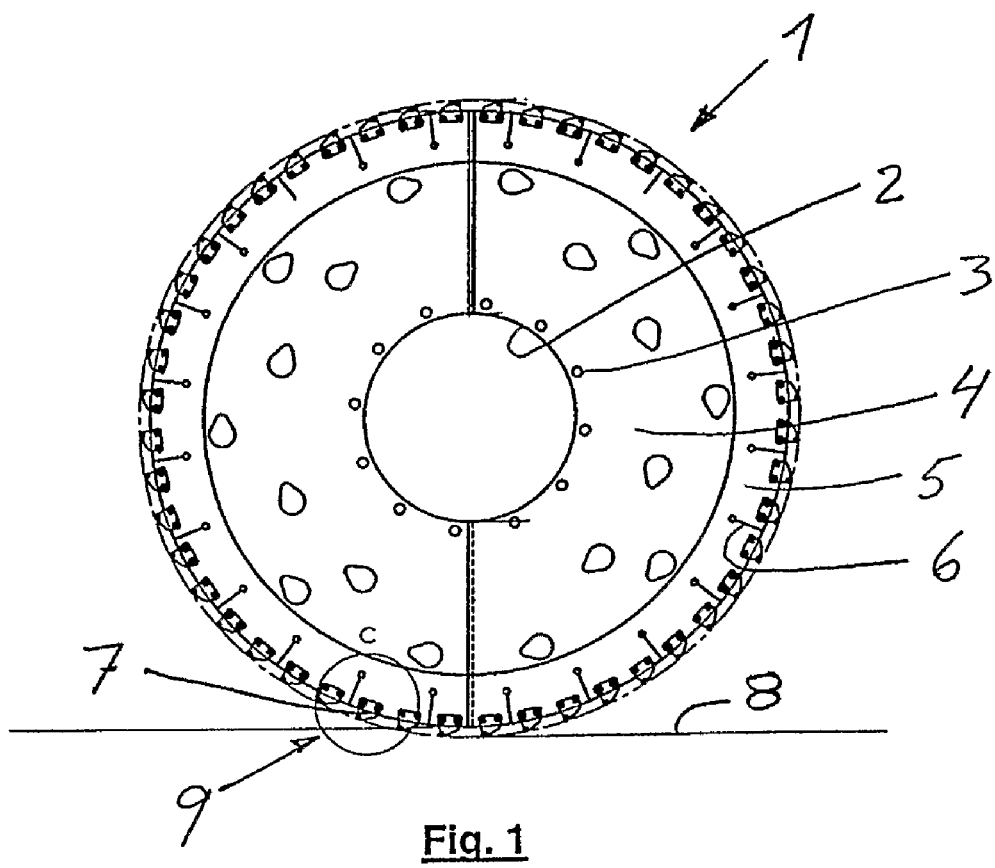
FIG. 1 shows a processing tool in accordance with the present invention, seen from the side.

FIG. 1 shows a processing tool 1 in the form of a circular disc with a boss 2 for mounting on a spindle in a machining unit or processing machine. The mounting holes 3 allow the processing tool to interact with bolts or projections on a flange on the spindle (not shown). The processing machine may be of a prior art type that allows the processing tool to rotate and to move linearly along a path corresponding to the extent and depth of the slot to be created. The machine may have additional equipment for handling and fixing the body to be processed (not shown). Such machines are available in a wide range of embodiments with which one skilled person is familiar and will not, therefore, be described in further detail here. As an alternative, the spindle may be stationary, while the body to be processed is moved in relation to it.

The processing tool 1 also has a central annular part 4, which extends from the boss to an outer peripheral part 5. Both the central annular part 4 and the outer peripheral part 5 may comprise slits or holes for better stability, among other things in relation to thermal stress. In particular, the outer peripheral part 5 is provided with slits 6 that ensure that thermal expansion in this area does not affect the flatness of the processing tool. Moreover, the slits will ensure a certain degree of springing or dampening of impacts that may occur in a tangential direction to the blade during the processing process. As the Figure also shows, the processing tool is enmeshed with a base 8.

In FIG. 1, an area by the periphery of the processing tool is marked with a ring 9. Within the ring are 3 cutting edge holders 7 with cutting edges, which will be described in further detail with reference to FIG. 2.

Figure 2:
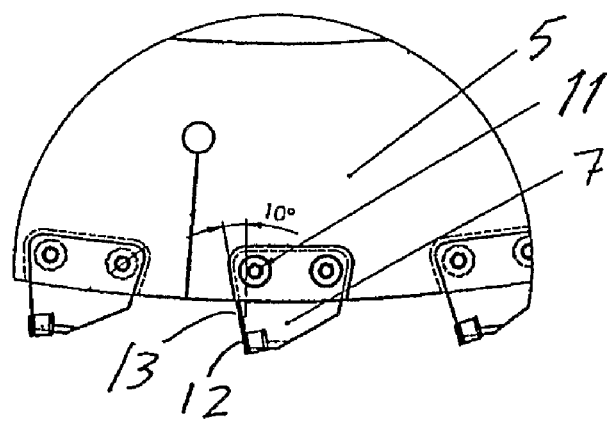
FIG. 2 shows an enlarged section of the processing tool shown in FIG. 1.
Figure 4:
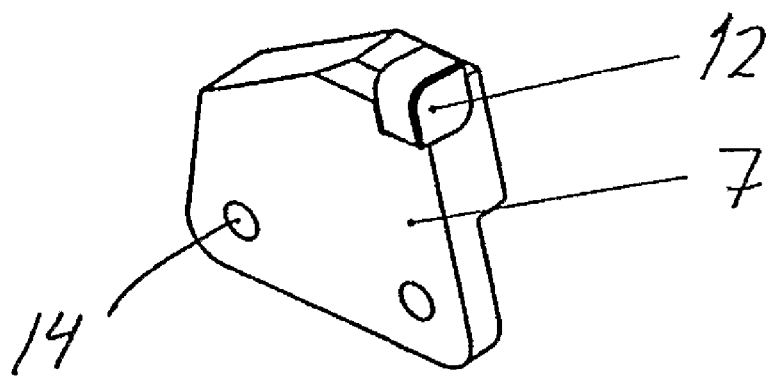
FIG. 4 shows a perspective view of a section of the processing tool shown in FIG. 1.

FIG. 2 shows a section of the processing tool shown in FIG. 1. In the outer peripheral part 5 are cutting edge holders 7, only one of which will be explained in further detail. In this connection, please also see FIG. 4, which shows a cutting edge holder in perspective. The cutting edge holder 7 may consist of a polygon. In this example, a pentagon is shown. The cutting edge holder may be fixed to the outer peripheral part 5 by means of one or more fixings 11 through holes 14.

Such fixings may consist of screws, rivets, etc. Alternatively, these parts may be joined by means of other available fixing techniques such as welding, gluing, etc.

The cutting edge holder 7 may also comprise a cutting edge 12 that may preferably be made of polycrystalline diamond (PCD). Other ceramics, composites or alloys with corresponding durability and suitability for processing calcinated carbon material may also be used.

The cutting edge 12 may be mounted in the cutting edge holder by means of various techniques based on gluing, braze welding, soldering, mechanical attachment, etc. As shown in the Figure, the cutting edge in this example is mounted so that its cutting surface is at a 10° angle to the radius of the processing tool or a perpendicular to the periphery at this point. Other angles may also be used. It is expedient for the angle to be in the order of 5-15°.

Figure 3:
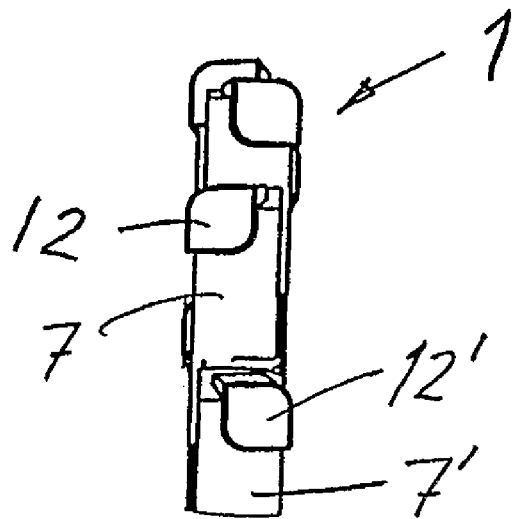
FIG. 3 shows a section of the processing tool in accordance with the present invention, seen from the front.

FIG. 3 shows a section of the processing tool 1, seen from the front. As the figure shows, the cutting edge holders 7, 7' may be mounted alternately against each side of the processing tool. The primary result of this is that the cutting edges 12, 12' may be mounted with a lateral displacement, which means that the slot that is processed may be made wider than if the cutting edges were mounted in a row. Moreover, the alternate displacement of the cutting edges means that both the cutting of material and transport of chips are very efficient in relation to the material to be processed.

Tests and experiments carried out show that good cutting of chips and low wear on the tool can be achieved when the speed of the cutting edges relative to the carbon body to be processed is in the range 100-300 meters per minute (m/min.). The particularly preferred speed is in the order of 200 m/min.

The speed of the cutting edges will partly depend on the composition and degree of calcination of the carbon body being cut. The size of particles and the content of anthracite, coke, pitch, binder, etc. in the formula may also be significant to the determination of the optimal cutting speed, Moreover, the static forces acting on the processing tool relative to the carbon body, plus the size and form of the cut chips, will also influence how the optimal cutting speed is to be determined.

Long-term tests show that it can be possible to mill slots in 20,000 anodes with the present processing tool before the tool needs to be replaced/overhauled. Tests carried out with available equipment resulted in considerable wear after just 200-300 anodes, and the tool had to be replaced/overhauled.

Slots created in anodes may be in the vertical plane and have a width of approximately 1 cm or more. Moreover, they may be so deep that the slots are present throughout the life of the anode. With current anode heights, this means that the slots are processed to a depth of approximately 35 cm. Moreover, they may be inclined so that gas can be drained towards one side of the anode. The inclination may be approximately 3 cm from one end of the slot to the other and may be produced by the anode being moved relative to the processing tool during processing.

Slots of a certain extent, for example 15 cm deep, may be preformed in a green state, after which the processing tool is used to remove any residue of packing coke from the calcination and to process the rest of the slot. This may reduce wear on the tool and the quantity of carbon material that is removed and needs to be handled (returned to the anode production process).

Moreover, several parallel slots may be arranged simultaneously in the carbon body by two or more processing tools being used on the body simultaneously, for example by their being arranged on the same rotating shaft at a certain axial distance from each other.

The machining unit may be enclosed to protect the environment against noise and dust, and it may comprise an extraction system.

Forms of processing of carbon bodies other than the creation of slots may also be carried out with the present invention. For example, the tool may be used for the calibration of or removal of burrs from the outer geometry of carbon bodies. In such case, the tool may be arranged so that it can be moved in all three axial directions, i.e. along a linear path, downwards and sideways.

Moreover, it may be relevant to create dovetail-shaped or undercut slots with the processing tool. The tool must then be permitted to rotate and move around an axis that is inclined or skew-oriented to the carbon body to be processed.

The invention claimed is:

1. A method for processing calcined carbon bodies, such as anodes or cathodes for use in connection with electrolytic production of aluminum, in which the carbon bodies are processed by a rotating processing tool, the method comprising arranging the processing tool so that processing in a radial direction is performed by a plurality of cutting edges of the processing tool, the plurality of cutting edges being disposed at an outer periphery of the processing tool, the processing tool including a planar disc with a mounting device being configured to enable the processing tool to be mounted onto a rotating spindle, and moving the processing tool and a carbon body relative to each other, so as to form at least one slot in the carbon body, wherein the at least one cutting edge is made of polycrystalline diamond (PCD) and has a speed greater than 100 meters/minute and less than 300 meters/minute, and wherein each cutting element edge of the plurality of cutting edges is disposed at the same radial distance from a center of rotation of the processing tool as each other cutting edge of the plurality of cutting edges, such that said each cutting edge has a cutting speed equal to a cutting speed of said each other cutting edge.

2. A method in accordance with claim 1, wherein the speed of said each cutting edge of the plurality of cutting edges is about 200 m/min.

3. A method in accordance with claim 1, wherein moving the processing tool and the carbon body includes moving the processing tool along a linear path.

4. A method in accordance with claim 1, wherein moving processing tool and the carbon body includes moving the carbon body along a linear path relative to the processing tool.

5. A method in accordance with claim 1, wherein said each cutting edge of the plurality of cutting edges has a cutting surface that processes the carbon body at an angle of about 5-15° to the radius of the processing tool.

6. A device for processing calcined carbon bodies, such as anodes or cathodes, for use in connection with the electrolytic production of aluminum, the device comprising:

a rotating processing tool for processing the carbon bodies, the processing tool including a mainly circular disc with cutting edges mounted at a periphery thereof, and including a planar disc with a mounting device being configured to enable the processing tool to be mounted onto a rotating spindle, wherein said processing tool is arranged so as to process in a radial direction by moving the processing tool and the carbon body relative to each other so as to format least one slot in said carbon bodies, and wherein said cutting edges are made of polycrystalline diamond (PCD), and wherein each cutting edge of the cutting edges is disposed at the same radial distance from a center of rotation of the processing tool as each other cutting edge of the cutting edges, such that said each cutting edge has a cutting speed equal to a cutting speed of said each other cutting edge.

7. A device in accordance with claim 6, wherein the cutting edges of the processing tool are mounted in cutting edge holders.

8. A device in accordance with claim 7, wherein the cutting edge holders are mounted alternately on each side of the disc.

9. A device in accordance with claim 6, wherein the cutting surface of the cutting edges is at an angle of about 5-15° to the radius of the processing tool.

10. A device in accordance with claim 6, wherein the cutting surface of the cutting edges is at an angle of about 10° to the radius of the processing tool.

11. A device in accordance with claim 6, wherein two or more processing tools are mounted axially displaced on the same shaft for simultaneous creation of two or more slots.

* * * * *